Patented Dec. 6, 1949

2,490,550

UNITED STATES PATENT OFFICE 2,490,550

MOISTUREPROOF HEAT SEALING COMPOSITION

John P. Sermattei, Wilmington, Del., assignor to E. I. du Pont de Nemours & Company, Wilmington, Del., a corporation of Delaware No Drawing. Application August 13, 1947, Serial No. 768,504

15 Claims. (Cl. 260—28.5)

This invention relates to moistureproof heat sealing compositions and more particularly to such compositions for use on flexible sheet materials such as paper, metal foils, regenerated cellulose film, cellulose acetate, ethyl cellulose and other transparent films.

Moistureproofing compositions based on nitrocellulose to which has been added plasticizers, resins and a minor amount of moistureproofing wax are well known in the art. Some of these compositions are heat sealing as well as moistureproofing and have quite a desirable combination of properties. However, they do have certain defects, notably, borderline blocking resistance at a satisfactory range of heat sealing temperatures, inferior moistureproofness after crumpling and are sensitive to minute variations in the proportions of the ingredients which tends to make their manufacture to a uniform quality quite difficult.

This invention has as an object the provision of a new type of heat sealing moistureproofing coating. A further object is the provision of a moistureproof heat sealing composition for use on flexible sheet materials which is glossy, transparent, non-smearing, non-tacky, free from odor and non-toxic. A still further object of this invention is the provision of a coating having moistureproofness both initially and after folding superior to the best nitrocellulose type. A still further object of this invention is the provision of a coating having improved heat sealing properties combined with improved resistance to blocking. Another object is the provision of a coating which is less sensitive to slight variations in the proportions of the ingredients so that the manufacture of a product of uniform quality is facilitated. A still further object is the provision of a coating which is basically more economical than conventional moistureproof heat sealing compositions. Other objectives will appear hereinafter.

These objects are accomplished by combining certain hard brittle resins, a specific rubbery type synthetic resin as a plasticizer and a moistureproofing wax. The resulting compositions yield coatings which are glossy, transparent, non-smearing, non-tacky, flexible, odor-free, moistureproof, heat sealable, non-blocking and non-toxic. Conventional plasticizers such as dibutyl phthalate, tricresyl phosphate, etc., and certain other rubbery type resins such as polyisobutylene when used with hard brittle resins are either incompatible in most cases or fail to yield coatings which are heat sealable or sufficiently block resistant, and it was not until the specific type of resinous or rubbery plasticizer was combined with certain hard resins that the above objects could be accomplished.

By the term "heat sealing," as applied to the coatings herein described, is meant the property of softening or fusing to form a satisfactory bond when subjected to momentary application of heat and pressure. The temperatures normally employed range from 100° C. to 200° C., the pressure varies from less than a pound to 50 pounds or more per square inch, and the time of dwell from a fraction of a second to several seconds.

In the laboratory these conditions have been standardized by superposing two coated strips several inches long and 1 inch wide coated side to coated side upon a platen heated to 125° C. A cushioned weight which applies a uniform pressure of 2 pounds per square inch is placed on the superposed strips for 5 seconds. The free ends are then placed in a tensile strength machine and pulled in opposite directions. A bond strength of 40 grams per inch width is considered satisfactory for many purposes, but the compositions herein disclosed give very much higher values generally, and in cases in which glassine paper is coated, the paper usually tears before the bond fails.

The coatings of this invention are prepared by dissolving the ingredients in a suitable aromatic solvent such as toluene in conventional lacquer mixing equipment. The specific resinous plasticizer is the rubbery copolymer resulting from the copolymerization of ethylene and vinyl acetate. The particular copolymer of ethylene and vinyl acetate that we prefer to use is one containing 3 mols of ethylene to 1 mol of vinyl acetate. However, copolymers containing ratios of ethylene to vinyl acetate ranging from 1 to 10 mols of ethylene to 1 mol of vinyl acetate can be used. The preferred copolymers fall in the range 2 to 4 mols ethylene to 1 mol vinyl acetate. As the ethylene to vinyl acetate ratio goes above 8 to 1, the solubility at ordinary temperatures decreases and mild heating up to about 60° C. is necessary to effect complete solution. At ratios below 1 mol ethylene to 1 mol vinyl acetate, unsatisfactory solubility is is obtained and with straight polyvinyl acetate (0 mol ethylene) moistureproofness and heat sealability are definitely unsatisfactory.

Copolymers of ethylene and vinyl acetate that have been partially hydrolyzed after polymerization are likewise satisfactory. However, in the case of these hydrolyzed copolymers, some alcohol is required in the solvent mixture with toluene in order to effect complete solution. The preferred hydrolyzed polymer is one containing a mol ratio of 2.6 mols ethylene to 1 mol vinyl acetate and hydrolyzed to the extent of about 15% calculated as polyvinyl alcohol. However, other copolymers in the range 2 to 4 mols ethylene to 1 mol vinyl acetate and hydrolyzed up to 30 or 35% on the same basis can also be used.

The viscosity of these ethylene-vinyl acetate copolymers is not an important feature of the invention, but the preferred resin gives a viscosity of 20 centipoises at 25° C. in a 10% solution in toluene. However, higher or lower viscosity resins can be used.

As far as we have been able to determine, these ethylene-vinyl acetate copolymers, together with the products resulting from their partial hydrolysis, are unique in the properties they impart to the compositions of this invention, and we have not found any other resinous or rubbery materials which produce equivalent results.

These copolymers are prepared in the following manner:

In a stainless steel shaker tube are charged 125 parts of vinyl acetate monomer, and 0.2 part of benzoyl peroxide. The tube is closed, flushed with oxygen-free nitrogen, evacuated, and then pressured with ethylene to about 500 atmospheres. The tube and contents are then heated at 70° C. and held at this temperature for about 9 hours. Under these conditions the pressure of the tube is in the range of 850–1000 atmospheres and is held within this range by repressuring with ethylene as needed. At the end of the reaction period, about 80 parts of polymer is obtained. This polymer has a composition of about 3 parts of ethylene to 1 part vinyl acetate on a molar basis. In practical operations it is desirable in many cases to introduce water in substantial amounts along with the vinyl acetate.

The preparation of ethylene-vinyl acetate copolymers may also be followed as described in U. S. Patent 2,200,429 and in applications of Hanford and Roland S. N. 446,116, filed June 6, 1942, and Hanford and Roland, S. N. 453,036, filed July 31, 1942, and both now abandoned.

In order to illustrate the preparation of partially hydrolyzed ethylene-vinyl acetate copolymers, we give the following directions for preparing a 13.5% and a 23% hydrolyzed ethylene-vinyl acetate copolymer. In both these cases, the starting material was an ethylene-vinyl acetate copolymer with an ethylene to vinyl acetate molal ratio of 2.6 to 1.

*13.5% hydrolyzed ethylene-vinyl acetate copolymer*

160 grams of ethylene-vinyl acetate copolymer were dissolved in 1200 cc. of benzene in a 3 liter, three-necked flask, and 700 cc. of isopropyl alcohol (99%) added. The mixture was heated to reflux and a solution of 7.9 grams of KOH in 100 cc. of isopropyl alcohol added all at once. The mixture was heated and mechanically stirred for two hours and then allowed to cool somewhat. The organic solvents were removed by distilling in steam. When the polymer had cooled, it was washed by kneading with water and further washed and dried on a rubber mill. The product had an amber appearance and gave the following analytical figures: saponification number: 316.5: relative viscosity of 1.685 (½% in m-cresol at 25° C.).

*23% hydrolyzed ethylene-vinyl acetate copolymer*

This preparation was carried out similarly except that the quantities used were 40 grams ethylene-vinyl acetate copolymer in 300 cc. benzene and a solution of 2.2 grams NaOH in 5 cc. water added to 200 cc. isopropyl alcohol. The product had a relative viscosity of 1.442 (½% in xylene at 25° C.) saponification number 288.6.

For the hard brittle resin component, various resins can be used and those that we have found to be particularly satisfactory are: (1) coumarone-indene resins having a melting point of about 150° C., (2) a maleic anhydride modified rosin having a melting point of 105–120° C., (3) phenol-formaldehyde modified rosin having a melting point of 121–180° C. Other hard brittle resins such as pentaerythritol esters of rosin or maleic anhydride modified rosin, ester gum, hydrogenated ester gum, polymerized rosin, and natural damar can be used, but the previously described three resins are preferred.

The hard brittle resins we prefer to use are those which have melting points above 100° C. and are resistant to oxidation. It is necessary that these resins be soluble in aromatic hydrocarbons and be compatible with the ethylene-vinyl acetate copolymers and with paraffin wax. It is preferable that these resins be light colored, free from odor and taste and non-toxic. In order to achieve the best combination of film hardness and flexibility, it is preferable to use the hardest, highest melting resins which will tolerate the largest amount of the ethylene-vinyl acetate copolymer without giving a soft, tacky film. These hard brittle resins may be used singly or in various combinations to give the best balance of properties. In those cases where the hard brittle resin is subject to oxidation, it may be desirable to introduce a small amount of anti-oxidant (about 0.5% based on the resin) to improve the aging properties of the coating.

The preferred and operative ratios of these various ingredients are as follows below:

|  | Preferred | Operative |
| --- | --- | --- |
|  | Per cent | Per cent |
| Ethylene-vinyl acetate copolymer (3:1) | 35 | 15–50 |
| Hard brittle resin | 55 | 30–80 |
| Moistureproofing wax | 10 | 1–30 |

For the moistureproofing wax, we prefer to use a paraffin wax, preferably one which has a fairly high melting point. The paraffin waxes which have been found to give particularly good results are: (1) fully refined domestic paraffin having a melting point of 60–64° C. and (2) Asiatic paraffin with a melting point not less than 60° C. Other paraffin waxes with lower melting points can also be used where extremely high moistureproofness is not required. Spermacetti, ceresin and the so-called amorphous or micro-crystalline waxes can also be used.

In order to describe this invention fully, several illustrative examples are given below but without in any way limiting the invention thereto.

*Example I*

| | Per cent |
| --- | --- |
| Ethylene-vinyl acetate copolymer (3:1) | 12.2 |
| Phenol-formaldehyde modified rosin, M. P. 172–180° C. | 19.3 |
| Refined paraffin (M. P. 60–64° C.) | 3.5 |
| Toluene | 65.0 |

These ingredients were mixed together at room temperature until a homogeneous solution was obtained. The order of mixing is not critical, but it is preferable first to dissolve the ethylene-vinyl acetate copolymer which requires vigorous agitation and then add the other ingredients and continue stirring until complete solution is achieved. This solution was coated on glassine paper at room temperature to give a coating weight of 3 pounds of solids per 3000 square feet distributed on the two sides of the sheet. The coating was dried for 30 seconds at a temperature of 100° C., drying occurring entirely by solvent evaporation. The coated paper had excellent gloss and transparency, was non-tacky and free from odor. It gave excellent heat sealing bonds over a temperature range of 100–150° C., the bonds being sufficiently strong to cause the paper to tear when the heat sealed strips were pulled apart. The coated paper also showed no blocking or marring when stacks of coated sheets were subjected to a pressure of 0.3 pound per square inch at 120° F. for a period of 24 hours. When the coated paper was tested for moisture-vapor permeability, a value was obtained of 30 grams per 100 square meters per hour at 39.5° C. under a vapor pressure differential corresponding to 100% relative humidity on one side of the film and less than three per cent on the other as determined in accordance with the procedure described in the Paper Trade Journal of October 3, 1935, pages 31–39. After folding into one inch squares, the coated paper gave a permeability value of 57 grams under the same test conditions.

Example II

| | Per cent |
|---|---|
| Ethylene-vinyl acetate copolymer (3:1) | 10.5 |
| Coumarone-indene resin M. P. 150° C. | 10.5 |
| Phenol-formaldehyde modified rosin, M. P. 172–180° C. | 10.5 |
| Refined paraffin wax (M. P. 60–64° C.) | 3.5 |
| Toluene | 65.0 |

This composition when prepared and coated on glassine paper in the manner described, for Example I, gave a coated paper with closely similar physical properties to that described in Example I.

Example III

| | Per cent |
|---|---|
| Ethylene-vinyl acetate copolymer (3:1) | 10.5 |
| Coumarone-indene resin, M. P. 150° C. | 21.0 |
| Refined paraffin (M. P. 60–64° C.) | 3.5 |
| Toluene | 65.0 |

This composition when applied to glassine paper in the manner described for the composition disclosed in Example I, gave a coated paper with similar physical properties, except that it has a slightly higher moisture vapor permeability value.

Example IV

| | Per cent |
|---|---|
| Ethylene-vinyl acetate copolymer (2.6:1) (15% hydrolyzed) | 12.2 |
| Phenol-formaldehyde modified rosin, M. P. 172–180° C. | 19.3 |
| Refined paraffin (M. P. 60–64° C.) | 3.5 |
| Toluene | 48.8 |
| Denatured alcohol | 16.2 |

This composition when applied to glassine paper in the manner described for the composition disclosed in Example I, gave a coated paper with similar physical properties.

Example V

| | Per cent |
|---|---|
| Ethylene-vinyl acetate copolymer (3:1) | 10.5 |
| Phenol-formaldehyde modified rosin, M. P. 121–129° C. | 22.7 |
| Refined paraffin (M. P. 60–64° C.) | 1.8 |
| Toluene | 65.0 |

This composition when coated on glassine paper in the maner described for the composition disclosed in Example I, gave a coated paper with similar physical properties, except that it had slightly improved appearance and the moistureproofness was very slightly impaired.

While it is preferable for most purposes to apply these coatings as solutions in organic solvents, it will be apparent to those skilled in the art that with some modifications in the proportions of the solid ingredients, these compositions can be applied in the molten state as hot melts. In this case the solvent and the drying operation are eliminated.

These coating compositions, when applied to glassine and various other types of paper, to regenerated cellulose, cellulose acetate, ethyl cellulose, polyethylene and to other types of transparent films and to metal foils, produce wrapping materials which are useful for packaging a wide range of products. For example these coated sheets can be used to protect foodstuffs such as bread, cakes, etc. against moisture loss or conversely to protect such products such as potato chips, popcorn, peanuts, etc. against moisture gain. By virtue of their heat sealing properties, these coated films can be used to produce hermetically sealed packages on automatic wrapping machines without the use of an additional adhesive. In addition to enhancing the appearance and sales appeal of products packaged in this manner, these packages will stand more handling and crumpling without the loss of moistureproofing qualities.

Furthermore, films coated with these compositions can be stored at high summer temperatures or under conditions existing in the tropics without danger of the coated films adhering to each other or blocking. By virtue of the excellent heat sealing properties of these compositions, it is possible to operate automatic wrapping machines at a faster speed, and to obtain satisfactory results over a wide range of heat sealing temperatures, making the adjustment of the temperature of the heat sealing machines less critical and their operation more foolproof.

In addition because the ratio of the ingredients to each other is less critical in these compositions than for nitrocellulose type heat sealing moistureproof lacquers, manufacture of batches of uniform quality is greatly facilitated. Furthermore, in addition to being superior in most physical properties to the best heat sealing moistureproof compositions based on nitrocellulose, these compositions are basically more economical to use in that a single hydrocarbon solvent is used which will facilitate solvent recovery and in that they are formulated from potentially lower cost raw materials.

By the term "moistureproof," I mean a degree of impermeability of the coated paper to watch vapor of less than about 600 grams per 100 square meters per hour over a 24 hour period at 39.5 degrees (plus or minus 0.5° C.) at a humidity differential of at least 95% when glassine paper is coated on both sides with a total weight of 3 pounds of non-volatile coating per 3000 square feet. Ordinarily in moistureproofing regenerated cellulose, a value of 570 grams per hour under the same conditions is considered satisfactory.

With respect to the amount of coating necessary, some variation exists due to the porosity and smoothness of the paper base. Ordinarily 3 pounds of coating solids per 3000 square feet coated on both sides is satisfactory on a very dense, smooth paper such as glassine. On regenerated cellulose and similar nonfibrous, smooth films, as little as 2 pounds per 3000 square feet coated on both sides may be used. On the other hand on more porous papers, the amount of coating may be increased to weights above 10 to 12 pounds, but in commercial runs these coating weights may be uneconomical and have more tendency to block.

It is apparent that many widely different embodiments of this invention may be made without departing from the spirit and scope thereof, and therefore, it is not intended to be limited except as indicated in the appended claims.

I claim:

1. A composition for rendering paper, regenerated cellulose and the like moistureproof and heat sealing which comprises from 15 to 50% of a copolymer of 1 to 10 mols of ethylene and 1 mol of vinyl acetate, 30 to 80% of a hard brittle thermoplastic resin and from 1 to 30% of a moistureproofing wax.

2. The composition of claim 1 which contains 35% of the copolymer, 55% of the resin and 10% of the moistureproofing wax.

3. The composition of claim 1 in which the copolymer contains from 2 to 4 mols of ethylene to 1 mol of vinyl acetate.

4. The composition of claim 1 in which the wax is paraffin and has a melting point above 60° C.

5. The composition of claim 1 in which the hard resin is resistant to oxidation and has a melting point above 100° C.

6. The composition of claim 1 in which the copolymer is partially hydrolyzed.

7. The composition of claim 1 in which the copolymer contains from 2 to 4 mols of ethylene to each mol of vinyl acetate and is hydrolyzed up to 15%.

8. The composition of claim 1 in which the copolymer contains from 2 to 4 mols of ethylene to each mol of vinyl acetate and is hydrolyzed up to 35%.

9. A pellicle having a coating thereon of the composition of claim 1.

10. A pellicle having a coating of the composition of claim 1 on both sides thereof in amount from 2 to 12 pounds per 3000 square feet on a non-volatile basis.

11. The article of claim 10 which has a moistureproofness of less than 600 grams per 100 square meters per hour.

12. The article of claim 9 in which the pellicle is regenerated cellulose.

13. The article of claim 9 in which the pellicle is paper.

14. The article of claim 9 in which the pellicle is glassine paper.

15. A glassine paper which has been rendered heat sealable and moistureproof by an adherent film of the following composition in parts by weight:

Ethylene-vinyl acetate copolymer (3:1)____ 12.2
Phenol-formaldehyde modified rosin, M. P. 172°–180° C._____ 19.3
Refined paraffin (M. P. 60–64° C.)_____ 3.5

JOHN P. SERMATTEI.

REFERENCES CITED

The following references are of record in the file of this patent:

UNITED STATES PATENTS

| Number | Name | Date |
|---|---|---|
| 2,075,106 | Fordyce et al. | Mar. 30, 1937 |
| 2,147,629 | Charch | Feb. 21, 1939 |
| 2,436,080 | Smith | Feb. 17, 1948 |